Figure 9:
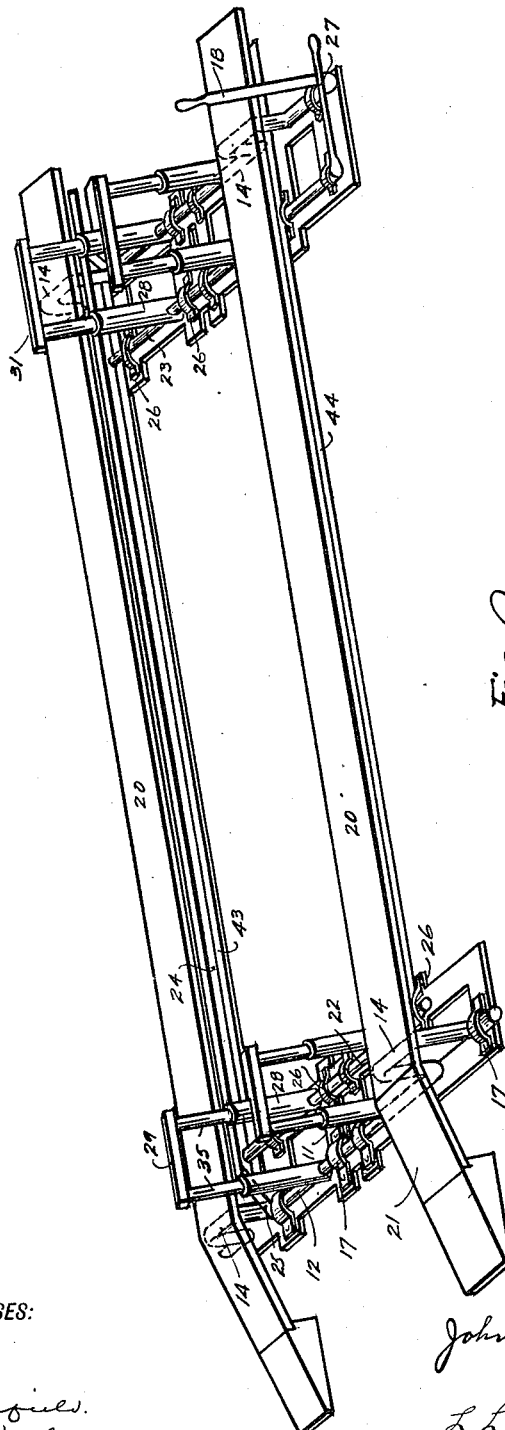

J. D. JOHNSON.
AUTOMOBILE SUPPORT.
APPLICATION FILED DEC. 6, 1913.
1,185,909.
Patented June 6, 1916.
3 SHEETS—SHEET 1.
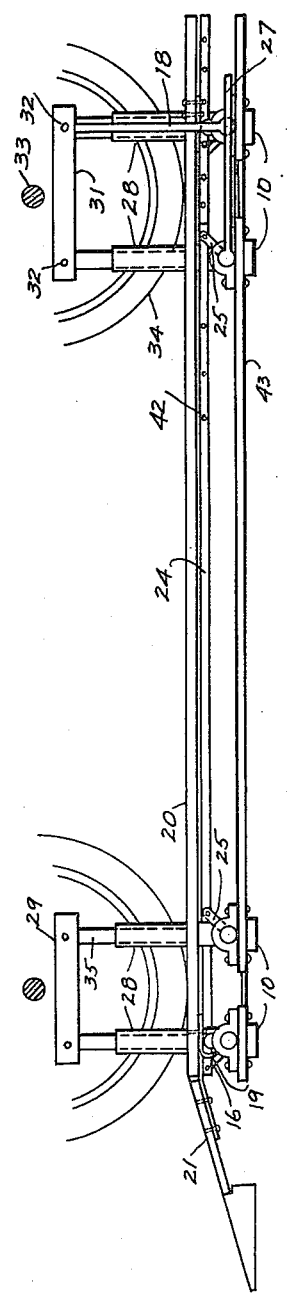
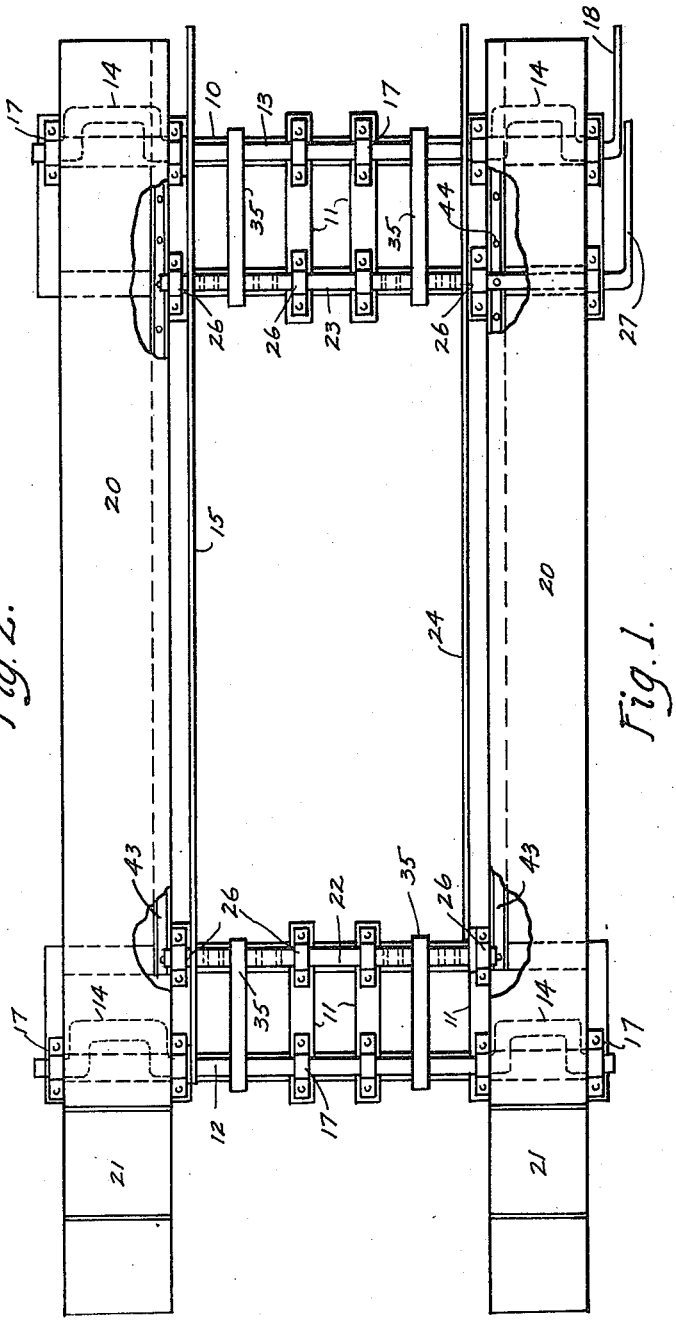
WITNESSES:
INVENTOR.
John D. Johnson
BY
L. L. Westfall
ATTORNEYS.

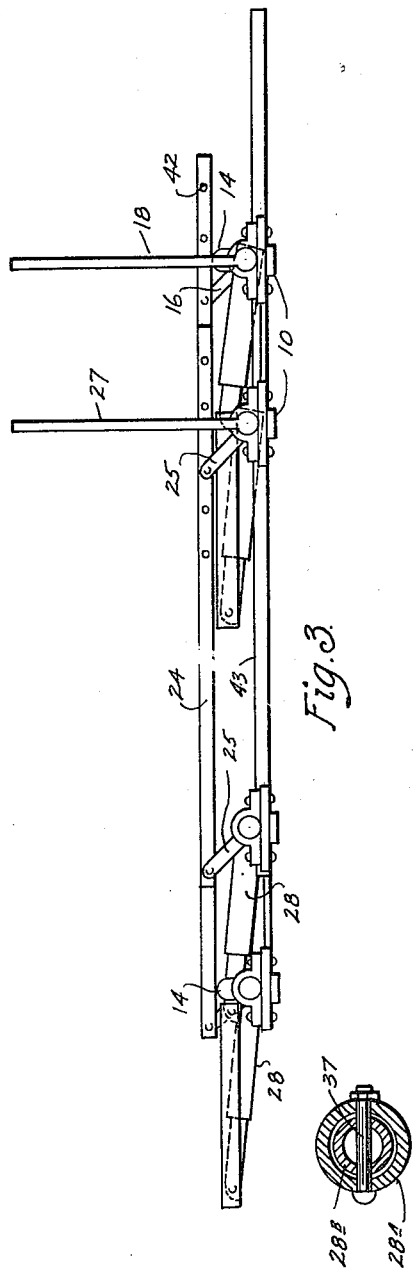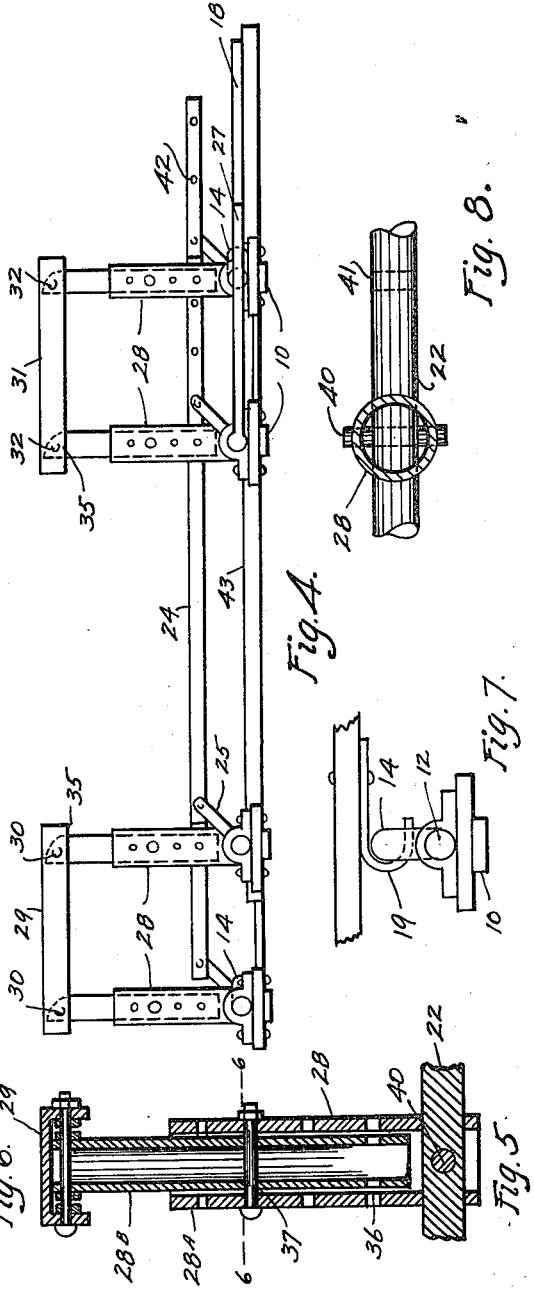

J. D. JOHNSON.
AUTOMOBILE SUPPORT.
APPLICATION FILED DEC. 6, 1913.

1,185,909.

Patented June 6, 1916.
3 SHEETS—SHEET 3.

WITNESSES:

INVENTOR
John D. Johnson
BY
L. L. Westfall
ATTORNEY

UNITED STATES PATENT OFFICE.

JOHN D. JOHNSON, OF SPOKANE, WASHINGTON.

AUTOMOBILE-SUPPORT.

1,185,909. Specification of Letters Patent. Patented June 6, 1916.

Application filed December 6, 1913. Serial No. 805,478.

*To all whom it may concern:*

Be it known that I, JOHN D. JOHNSON, a citizen of the United States of America, residing at Spokane, in the county of Spokane and State of Washington, have invented certain new and useful Improvements in Automobile-Supports, of which the following is a specification.

This invention pertains to supports for automobiles and has for its object to provide a construction for supporting the weight of an automobile on its axles when stationary and not in use, so that the wheels are suspended, the weight being taken off of them thereby saving the tires and permitting of the taking off of the wheels or tires without further adjustment.

A further object is to provide supports of the character named that are adjustable for the different length of wheel base of automobiles, and of the height of the wheels and width of machines.

The apparatus consists of the construction, combination and arrangement of parts hereinafter described, pointed out in the claim and illustrated in the accompanying drawings, in which—

Figure 1, is a top plan view of the apparatus with the running boards broken-away and the parts in the position they would be when supporting an automobile. Fig. 2, is a side elevation of the same with the running boards elevated and supporting the wheels showing also a broken-away view of an automobile wheel and an axle thereof. Fig. 3, is a side elevation of the apparatus with the running boards removed, showing the supporting jacks in a folded position. Fig. 4, is a side elevation of the same with the jacks in an elevated position, the same being the position they occupy when supporting an automobile, Fig. 5, is a longitudinal sectional view of one of the shafts of the jacks, a transverse sectional view of the crown thereof, and showing the manner of supporting the shafts, Fig. 6, is a transverse sectional view taken on the line 6—6 of Fig. 5, Fig. 7, is an enlarged broken-away view of the end of Fig. 2, and Fig. 8, is a broken-away longitudinal view of one of the transversely arranged shafts supporting the jacks, together with a transverse sectional view of one of the shafts of the jacks. Fig. 9 is a perspective view of the apparatus.

In the detail description, wherein like numerals refer to like parts throughout the several views, a frame consisting of the transverse pieces 10 and the longitudinal pieces 11 provide the supporting means. Transversely arranged across the frame are shafts 12 and 13, each provided at each end with a cam 14, the two connected by a drag bar 15 by means of arms 16. Said shafts 12 and 13 are journaled in the bearings 17 in which they are adapted to oscillate. To the end of the shaft 13 is secured a hand lever 18. Secured to the cams 14 of the shafts 12 and 13, as by links 19, are running boards 20 having approaches 21 leading thereto from the ground level. Also transversely arranged across the frame are shafts 22 and 23 connected by the drag bar 24 by means of the arms 25. Said shafts 22 and 23 are journaled in the bearings 26 in which they are adapted to oscillate. To the end of the shaft 23 is secured a hand lever 27. Loosely secured to each of the shafts 12 and 13 and rigidly secured to each of the shafts 22 and 23 are two shafts 28, the ones on shafts 12 and 22 being connected at their upper ends by crown pieces 29 pivoted thereto, as at 30, and the ones on shafts 13 and 23 being connected at their upper ends by crown pieces 31 pivoted thereto, as at 32.

In the practical use of the apparatus, an automobile is driven with the wheels on to the running boards 20, mounting by means of the approaches 21, the shafts 28 being in the position shown in Fig. 3 and the running boards in the position shown in Fig. 2. By throwing the lever 27 from the vertical position shown in Fig. 3 to the horizontal position shown in Fig. 4, the shafts 28 are elevated to the position shown in Figs. 2 and 4 and the crown pieces 29 and 31 are directly underneath the axles 33 of the automobile, the weight of the car being upon the wheels 34 resting on the running boards 20. By throwing the lever 18 from the vertical position shown in Fig. 2 to the horizontal position shown in Fig. 1, the cams 14 supporting the running boards 20 are turned from the perpendicular position shown in Fig. 2 to the horizontal position shown in Fig. 1, thereby dropping the running boards 20 a sufficient distance to throw the axles 33 in contact with the crown pieces 29 and 31, whereby the weight of the car is shifted from the wheels 34 to the axles 33.

In order to make jacks 35 adjustable in height, the shafts 28 are made in two parts 28ᵃ and 28ᵇ (Fig. 5), the part 28ᵃ engaging the part 28ᵇ as a sleeve thereto, openings 36 being made through both parts 28ᵃ and 28ᵇ, whereby by means of bolts 37 the two parts are connected with the part 28ᵇ elevated to the desired position.

The apparatus may be adjusted laterally to bring the jacks 35 in the desired positions by the adjustment of the shafts 28 by the changing of the relative positions of the same and securing them by the bolts 40 through the openings 41.

The jacks 35 may be adjusted longitudinally of the apparatus by shifting the positions of the shafts 12 and 13, and 22 and 23 upon the frame. The connecting rods 15 and 24 are made long enough to permit of any reasonable adjustment of this character and are provided with openings 42 by means of which the arms 16 and 25 may be adjusted thereto at the changed positions. The connecting rods 43 are also provided with openings 44 to which bolts are adjusted and by means of which the frame may be longitudinally expanded.

What I claim is,

In a jack mechanism for vehicles, pivoted means for supporting a vehicle by its bearing wheels in a relatively horizontal position, pivoted axle jacks in subjacent spaced relation with respect to the axles of said vehicle when the latter is so supported, mechanism for shifting said means on its pivots to transfer the weight of the vehicle from its wheels to said axle jacks, and means for shifting said axle jacks on their pivots to transfer the weight of said vehicle to said wheel supporting means, substantially as described.

In testimony whereof I affix my signature in presence of two witnesses.

JOHN D. JOHNSON.

Witnesses:
 WILLIAM H. KAYE,
 GEO. E. CANFIELD.